US011943848B2

(12) United States Patent
Van Bommel et al.

(10) Patent No.: US 11,943,848 B2
(45) Date of Patent: Mar. 26, 2024

(54) CONTROLLER FOR CONTROLLING PROPERTIES OF LIGHT

(71) Applicant: SIGNIFY HOLDING B.V., Eindhoven (NL)

(72) Inventors: Ties Van Bommel, Horst (NL); Rifat Ata Mustafa Hikmet, Eindhoven (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 237 days.

(21) Appl. No.: 17/631,025

(22) PCT Filed: Jul. 27, 2020

(86) PCT No.: PCT/EP2020/071071
§ 371 (c)(1),
(2) Date: Jan. 28, 2022

(87) PCT Pub. No.: WO2021/018812
PCT Pub. Date: Feb. 4, 2021

(65) Prior Publication Data

US 2022/0272805 A1 Aug. 25, 2022

(30) Foreign Application Priority Data

Aug. 1, 2019 (EP) .................................... 19189519

(51) Int. Cl.
*H05B 45/20* (2020.01)

(52) U.S. Cl.
CPC .................................... *H05B 45/20* (2020.01)

(58) Field of Classification Search
CPC ...................................................... H05B 45/20
USPC .......................................................... 315/291
See application file for complete search history.

(56) References Cited

U.S. PATENT DOCUMENTS

| | | | | |
|---|---|---|---|---|
| 10,187,952 | B2 | 1/2019 | Ciccarelli et al. | |
| 10,621,836 | B2 * | 4/2020 | Sooch | H05B 45/20 |
| 11,083,060 | B2 * | 8/2021 | Song | H05B 47/11 |
| 2011/0254027 | A1 | 10/2011 | Harrah et al. | |
| 2013/0002157 | A1 | 1/2013 | Van De Ven et al. | |
| 2015/0327343 | A1 | 11/2015 | Dai et al. | |
| 2016/0150616 | A1 | 5/2016 | Bell et al. | |
| 2018/0077770 | A1 * | 3/2018 | Sooch | H05B 45/20 |
| 2018/0376560 | A1 | 12/2018 | Ciccarelli et al. | |
| 2019/0008013 | A1 * | 1/2019 | Diana | H05B 45/24 |

(Continued)

FOREIGN PATENT DOCUMENTS

| | | | |
|---|---|---|---|
| WO | 2011070494 | A2 | 6/2011 |
| WO | 2011092625 | A1 | 8/2011 |
| WO | 2015175657 | A1 | 11/2015 |

*Primary Examiner* — Ryan Jager

(57) ABSTRACT

A controller (1) configured to control properties of light emitted from a light emitting device (4), the controller comprises a control device (2) and a processing unit (3). The control device (2) enables a user to select a color point of the light emitted from the light emitting device (4) in a color space of the light emitting device. The selection of the color point is done by the user providing a single input to the control device (2). The processing unit (3) being configured to change the color point of light emitted from the light emitting device based on the single input. The change of the color point is done along a meandering curve extending along the black body locus (BBL) in accordance with the received single input.

13 Claims, 7 Drawing Sheets

(56) References Cited

U.S. PATENT DOCUMENTS

| | | | | |
|---|---|---|---|---|
| 2019/0021150 | A1 | 1/2019 | Rainer et al. | |
| 2022/0272805 | A1 * | 8/2022 | Van Bommel | H05B 45/20 |

* cited by examiner

CONTROLLER FOR CONTROLLING PROPERTIES OF LIGHT

CROSS-REFERENCE TO PRIOR APPLICATIONS

This application is the U.S. National Phase application under 35 U.S.C. § 371 of International Application No. PCT/EP2020/071071, filed on Jul. 27, 2020, which claims the benefit of European Patent Application No. 19189519.2, filed on Aug. 1, 2019. These applications are hereby incorporated by reference herein.

FIELD OF THE DISCLOSURE

The present invention relates to a controller for controlling properties of light emitted from a light-emitting device, where the controller comprises a control device and a processing unit.

BACKGROUND OF THE DISCLOSURE

With the advance of LED technology, lighting systems and lamps having variable color temperature are finding an increased use both in professional and consumer environments. In such lighting systems, a desired color temperature may be obtained by combining the light from several light sources having different colors and/or color temperatures (CTs).

In some environments, it may be desired to control not only the color temperature (i.e. adjusting from more bluish white light to more yellowish white light and vice versa), but also the tint (i.e. more greenish white light, more magenta white light, more cyan white light or more reddish white light), of the output light. Control systems providing such control may however be complex and hard to use for the average user.

US 2018/376560 A1 discloses a system, which allows a light fixture to have a wider range of color temperatures while limiting the warmest temperature reached at full intensity. US 2018/376560 A1 also discloses that intensity may be adjusted from a first handle, while color temperature may be adjusted from a second handle.

There is therefore still a need for a more flexible and easy way of controlling both the color temperature and the tint of white light.

US 2013/002157 discloses a light emitting device that includes a first string of LEDs that emit light having a color point that is within at least eight MacAdam ellipses of a first blue-shifted-yellow region on the 1931 CIE Chromaticity Diagram, a second string of LEDs that emit light having color point that is within at least eight MacAdam ellipses of a second blue-shifted-green region on the 1931 CIE Chromaticity Diagram, and a third light source that emits radiation having a dominant wavelength between 600 and 720 nm. A drive circuit supplies respective drive currents to the first string of LEDs, the second string of LEDs and the third light source, at least two of which are independently controllable.

SUMMARY OF THE DISCLOSURE

An object of the present invention is to at least partly alleviate the above-discussed drawbacks of the prior art, and further to provide a controller, a system and a method for controlling the properties of light which enable a more flexible and easy way of controlling both the color temperature and the tint of white light.

According to a first aspect of the invention there is provided a controller configured to control properties of light emitted from a light emitting device, the controller comprising:

a control device; and a processing unit;

the control device being configured to enable a user to select a color point of light emitted from the light emitting device in a color space of the light emitting device, the color point being defined based on a tint and a color temperature, wherein the selection of the color point is done via a single input provided to the control device, the processing unit being configured to change the color point of light emitted from the light emitting device based on the single input received via the control device, wherein the processing unit being configured to change the color point along a meandering curve extending along the black body locus (BBL) in accordance with the received single input.

The controller thus only needs to receive a single input for changing the color point of light emitted from a light emitting device. Thereby an easy and intuitive way of changing the color point of light is provided for a user of the controller.

The processing unit may be configured to change the color point of light emitted from the light emitting device from a first color temperature to a second color temperature. The first color temperature and the second color temperature are both points on the meandering curve.

Further, by having processing unit changing the color point along a predetermined curve the user is allowed to easily achieve the desired color point, since it is easy to predict the change of the color point. The limitation of the color point to a meandering curve also decreases the processing power required of the processing unit.

The meandering curve, with which the processing unit is configured to change color point along, may be given by a manufacturer of the controller, where the controller may comprise a plurality of different meandering curves from which a user can choose, allowing a user of the controller to achieve a desired color point or a desired change of color point. Thereby, the manufacturer can adapt the light emitting device to provide light customized to a specific application in which specific light properties are required, and thus to provide tailor made light emitting devices.

The meandering curves may alternatively be given by a user defining one or several meandering curves with which the processing unit is configured to change the color point of light emitted from the light emitting device. Thereby, a light emitting device having a large degree of versatility in terms of applications is provided for, which in turn provides the user with a large degree in freedom of use of the light emitting device.

In an embodiment of the controller the meandering curve is centralized around the BBL.

By having the meandering curve centralized around the BBL a wide variety of tints may be obtained.

In an embodiment of the controller the meandering curve is non-centralized around the BBL.

By having the meandering curve non-centralized around the BBL an emphasis may be placed on certain tints. This is advantageous as e.g. in some settings it may be preferable to emphasise tints which match the surroundings of the light emitting device.

In yet an embodiment of the controller a half period of the meandering curve is preferably in the range from 300 to 1000 K, in the range from 350 to 700 K, or in the range from 400 to 600 K, such as 500 K.

Thereby, the sensitivity of the controller may be optimized such as to ensure a high degree of sensitivity relative to the total interval of color temperatures which it is desired to cover. A certain degree of sensitivity is desired to allow fine tuning of the color point, while a too large sensitivity may render the tuning process too cumbersome for the user.

In an embodiment of the controller the meandering curve intersects the BBL in or at least five of the following color temperatures: 6000 K, 5500 K, 5000 K, 4500 K, 4000 K, 3500 K, 3000 K, 2700 K, 2500 K, 2300 K.

Selecting at least some of the above-mentioned color temperatures as points of intersection between the meandering curve and the BBL ensures that the selected color temperatures, here the most commonly used and desired color temperatures within lighting, are represented as choices achievable with the controller.

In an embodiment of the controller the amplitude of the meandering curve is at least 10 standard deviation color matching (SDCM), at least 15 SDCM, or at least 20 SDCM.

By having a minimum on the amplitude of the meandering curve it may ensure that a user is able not only to notice the change in color temperature, but also notice a change in tint, when the processing unit is changing the color point of light emitted from the light emitting device.

In an embodiment of the controller an amplitude of the meandering curve decreases with decreasing color temperatures.

Thereby, when selecting light with lower color temperatures, and thus warmer light, a smaller deviation from the BBL and thus a lesser degree of tint is ensured. This in turn makes the resulting light more agreeable to the viewer.

In an embodiment of the controller the decrease in amplitude is gradual and at least 10% over one period.

In an embodiment of the controller a period of the meandering curve decreases with decreasing color temperatures.

Thereby, the controller is provided with a larger sensitivity for lower color temperatures, and thus warmer light. This in turn enables the user to further fine tune the color point at lower color temperatures, and makes the resulting light more agreeable to the viewer.

In an embodiment of the controller the decrease in period is gradual and at least 10% over one period.

In an embodiment of the controller the meandering curve is phase shifted when the color point goes beyond or to a preset threshold point for the color point and/or the time derivative of the color temperature changes sign.

By phase shifting the meandering curve the user of the controller is allowed to reach an even wider variety of tints, e.g. if the user has reached the desired color temperature but wants a different tint, this may then be achieved by phase shifting the meandering curve.

In an embodiment of the controller the processing unit is further configured to decrease the luminous flux of the light emitting device according to an additional curve, while decreasing the color temperature of the light emitting device.

Thereby, the processing unit may be configured to change the properties of light emitted from a light emitting device based not only on a meandering curve adapted to the BBL, but also to change the properties light based on an additional curve. Such an additional curve may indicate a luminous flux of the light emitting device as a function of color temperature.

This provides for a controller with which further parameters of possible light outputs may be adjusted. For instance, using an additional curve indicating a luminous flux of the light emitting device as a function of color temperature provides for also including an improved dimming effect in the output range achievable.

In an embodiment of the controller the control device is a button, a dial, a slider or a lever.

The control device may be a physical object via which a user can give an input to the controller, the control device may also be a virtual representation, e.g. on a touch screen, of a button, a dial, a slider or a lever, the user then being able to deliver a single input to the controller via the virtual representation.

According to a second aspect of the invention there is provided a lighting system for controlling properties of light emitted from a light emitting device, the lighting system comprising:

a controller according to any one of the above embodiments; and a lamp, a luminaire or a lighting fixture, wherein the controller is communicatively connectable to or connected with the lamp, luminaire or lighting fixture.

According to a third aspect of the invention there is provided a method of controlling properties of light emitted from a light emitting device, the method comprising the steps of:

providing a controller according to any of the embodiments of the first aspect of the invention, and giving a single input to the user interface of the controller to control the properties of light emitted from the light emitting device, and by means of the processor of the controller, changing the color point of the light emitted from the light emitting device in a color space of the light emitting device based on the single input received at the user interface.

Further objects, features and advantages of the present invention will become apparent from the following detailed description, the drawings and the appended claims. Those skilled in the art will realize that different features of the present invention may be combined to create embodiments other than those described in the following.

BRIEF DESCRIPTION OF THE DRAWINGS

This and other aspects of the present disclosure will now be described in more detail, with reference to the appended drawings showing embodiment(s) of the disclosure.

DETAILED DESCRIPTION

The present disclosure will now be described more fully hereinafter with reference to the accompanying drawings, in which currently preferred embodiments of the disclosure are shown. This disclosure may, however, be embodied in many different forms and should not be construed as limited to the embodiments set forth herein; rather, these embodiments are provided for thoroughness and completeness, and fully convey the scope of the disclosure to the skilled person.

Figure 1:
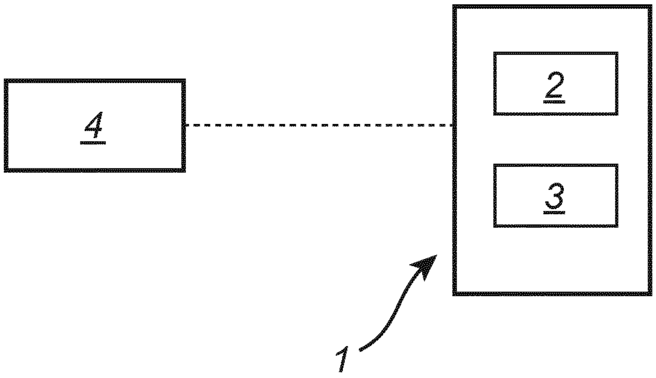
FIG. 1 shows a schematic view of an embodiment of a controller with a control device and a processing unit, the controller being connected to a light emitting device.

FIG. 1 shows a schematic view of an embodiment of a controller 1 according to the disclosure and being connected to a light emitting device 4.

Generally, and irrespective of the embodiment, the controller 1 according to the invention comprises a control device 2 and a processing unit 3.

The control device 2 enables a user to select a color point of a light emitting device 4, by giving a single input to the control device 2. The color point is a point in color space defined based on a tint and a color temperature. The color point of the light emitted from the light emitting device 4 may be changed along a meandering curve extending along the black body locus (BBL). The color point is a two-dimensional point in color space, where the two dimensions specify color temperature and standard deviation of color matching (SDCM).

The light emitting device 4 may comprise red light emitting diode(s) (LED), green LED(s) and blue LED(s), and the meandering curve may be adapted to individually control the LED(s), thereby allowing control over different color tints. The light emitting device 4 may also comprise warm white LED(s), e.g. 2200K, and/or cool white LED(s), e.g. 5000K. The warm white LED(s), and cool white LED (s), may be added for mainly driving the color temperature, while the RGB LED(s) may mainly control the tints, thereby reducing the complexity needed for the processing unit 3, since mainly one parameter needs to be controlled per LED.

The black body locus (BBL) (also known as Planckian locus, or white line) is the path or locus that the color of an incandescent black body would take in a particular chromaticity space (e.g., in a chromaticity diagram) as the temperature of the black body changes. The locus goes from deep red at relatively low temperatures (at about 700 K), on through orange, yellowish white, white, and finally bluish white at higher temperatures.

A so-called MacAdam ellipse is used in a system of color measurement to measure how much color variation is possible around the axe of a MacAdam ellipse before the human eye detects a color change. A series of concentric MacAdam ellipses may be drawn around any target color, and the closer any given light output is to the target, the less color deviation will be experienced when these lamps are placed side by side in an installation. The distance from the target point in each MacAdam ellipse is measured in SDCM (Standard Deviation of Color Matching). An SDCM of 1 means that there is no visible color difference, 2-3 SDCM means that there is hardly any visible color difference, while 4 or more SDCM is readily noticeable by the human eye. The lower the number of SDCM, the smaller the color shift.

The processing unit 3 is configured to change the color point of light emitted from the light emitting device 4 based on the single input received via the control device 2. When receiving the single input, the processing unit 3 will change the color point 5 of light emitted from the light emitting device 4, change of the color point 5 will follow along a meandering curve in color space. The meandering curve will be elaborated on further below. The change of the color point 5 may follow continuously along the meandering curve or it may jump or shift abruptly along the curve. The processing unit is configured to increase or decrease the color temperature while oscillating the SDCM to achieve different tints at different color temperatures. A meandering curve may be any type of curve following a winding course. By way of a non-limiting example, the meandering curve may be a sinusoidal curve.

The processing unit 3 and the light emitting device 4 may be connected or connectable wirelessly, e.g. through a wireless local area network, WLAN, Bluetooth, Wi-Fi or similar. The processing unit 3 and the light emitting device 4 may also or alternatively be connected or connectable through a wired connection, e.g. a plug and socket connection, a local area network or similar.

The control device 2 may be represented as a button, a dial, a slider, a lever or similar. Alternatively the controller 1 may be provided with a control device 2 in the form of a user interface where a virtual representation may be provided of a button, a dial, a slider, a lever or similar, and where the user of the controller 1 may then interact with the virtual representation of the control device to select a color point via a single input to allow the processing unit 3 to change the properties of light emitted from a light emitting device 4 connected or connectable to the processing unit 3 based on the single input. Such a user interface may for instance be a touch screen, e.g. a touch screen of a mobile telephone, tablet computer, laptop computer or the like.

Figure 2:
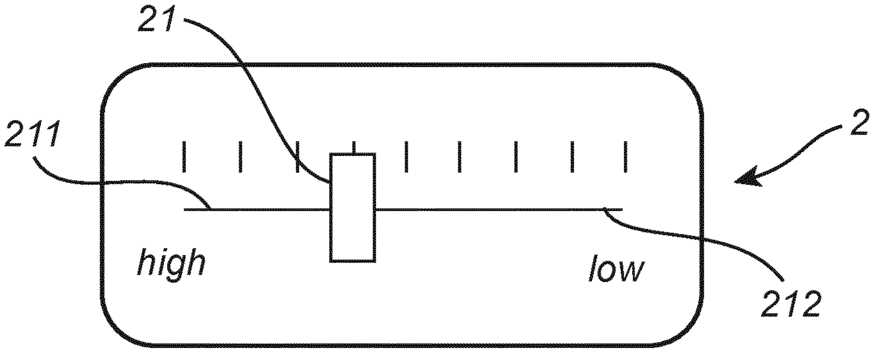
FIG. 2 shows a schematic view of a control device in the form of a slider.
Figure 3:
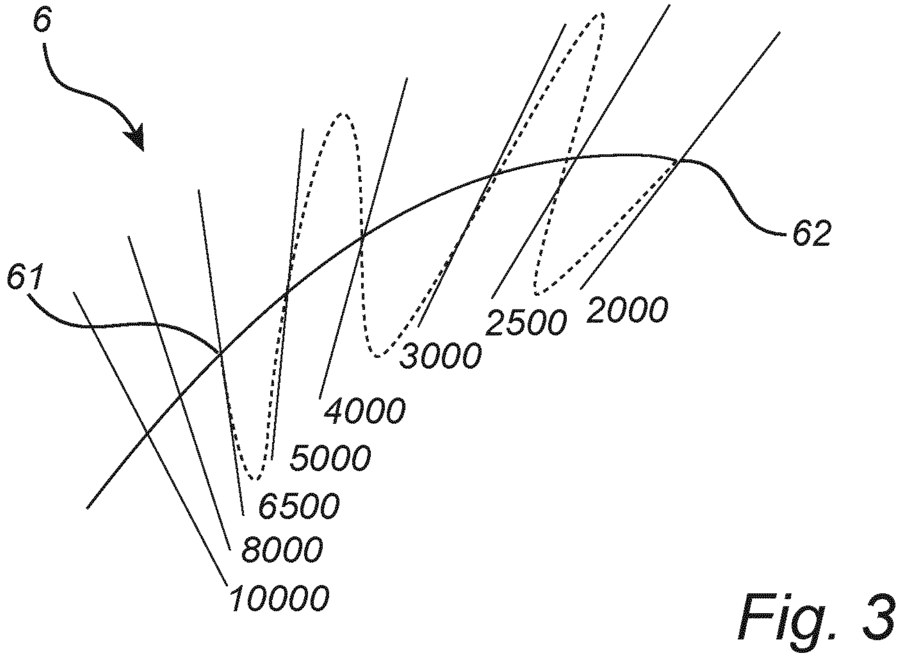
FIG. 3 shows a meandering curve adapted to the black body locus (BBL) in color space.

Reference is now made to FIG. 2 and FIG. 3, FIG. 2 shows an embodiment of a control device 2 according to the invention, and FIG. 3 shows a meandering curve 6 in color space according to the invention. The control device 2 shown is in the form of a slider 21. The slider 21 allows a user to deliver a single input to the control device 21 by moving the slider 21. The meandering curve 6 in the shown embodiment is adapted along the BBL. Different adaptations may be made, and some of these will be presented later. The control device 21 may have the meandering curve 6 directly associated with it, which may be carried out by having the ends of the slider 21 corresponding to two different curve values on the meandering curve 6, with a first slider end 211 corresponding to a first curve value 61 with a high color temperature and the second slider end 212 corresponding to a second curve value 62 with a low color temperature. The slider steps in-between the two ends then corresponds to color temperature values in-between the first curve value 61 and the second curve value 62. Similar implementations may be achieved with different types of control devices 2, such as a lever, a dial or similar.

Such a set-up allows for an easy overview of the setting available and gives an intuitive control of the properties of light. In the case of the control device being a control device of a type where the control device itself does not define a range as provided with the two ends of a slider as described above, the meandering curve may be predetermined with a high and low threshold value for the color temperature, e.g. the first curve value 61 and the second curve value 62 being the high and low threshold value respectively. The processing unit 3 may then be configured such that a push of the control device 2, e.g. being a button, signals the processing unit 3 to change the color point towards the first curve value 61. When the first curve value 61 is then reached, the processing unit 3 may be configured to change the color point towards the second curve value 62 thereby allowing a user to reach all color temperatures in-between the first curve value 61 and the second curve value 62. E.g. in the case of the processing unit 3 increasing the color temperature when the control device 2 is pressed, then when the first curve value 61 is reached it may be configured to start to decrease the color temperature when the control device 2 is pressed again.

Figure 4:
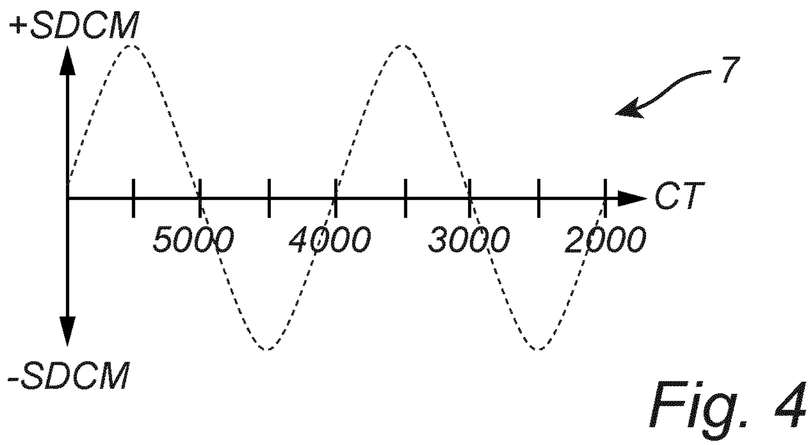
FIG. 4 shows a meandering curve, which is centralized around the BBL in color space.
Figure 5:
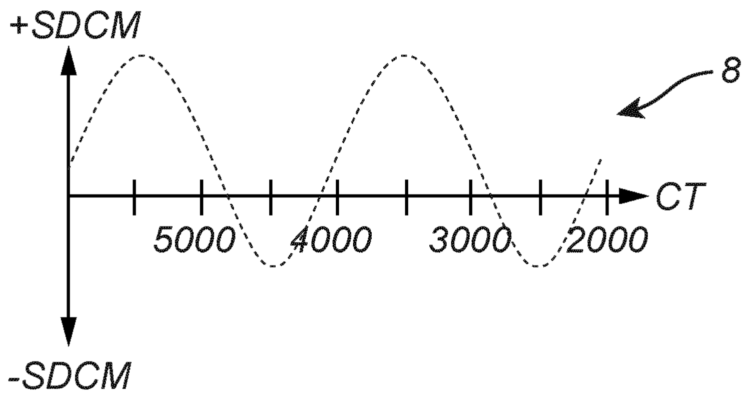
FIG. 5 shows a meandering curve, which is decentralized around the BBL in color space.

Referring now to FIG. 4 and FIG. 5, two different possibilities for predetermined curves are shown, both being meandering curves adapted to the BBL. On FIG. 4 the meandering curve 7 is adapted centrally around the BBL, so the average value of one period of the meandering curve 7 is zero. By having the meandering curve 7 centrally adapted around the BBL a large number of tints are available for a user. FIG. 5 shows a meandering curve 8 which is non-centrally arranged around the BBL, meaning that the average value of one period of the meandering curve 8 differs from zero. This may be advantage if an emphasis is wanted on particular tints.

Figure 6:
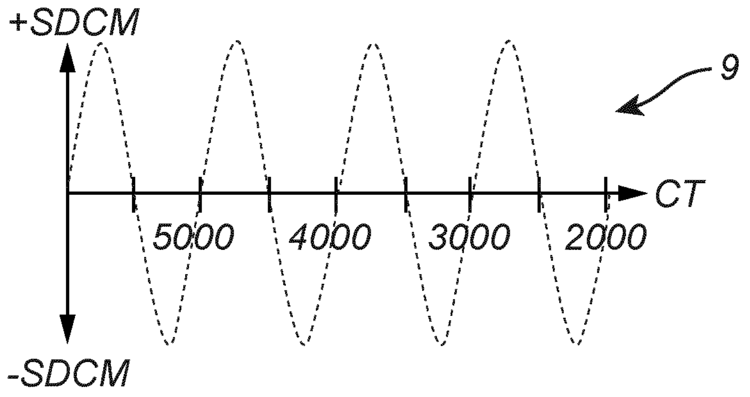
FIG. 6 shows a meandering curve adapted around the BBL with a half period of 500K.

Referring to FIG. 6, another possibility for a meandering curve 9 adapted to the BBL is shown. The meandering curve 9 shown has a half period of 500 K. A half period of a meandering curve adapted to the BBL may be in the range of 300 K to 1000 K, it may also be in the range of 350 K to 700 K or in the range of 400 K to 600 K. The meandering curve 9 shown intersects the BBL in 6000 K, 5500 K, 5000 K, 4500 K, 4000 K, 3500 K, 3000 K or 2500 K, though different curve adaptations may intersect the BBL in different points, intersections may also happen at 2700 K and 2300 K. The amplitude of a meandering curve adapted to the BBL may be at least 10 SDCM, 15 or 20 SDCM.

Figure 7:
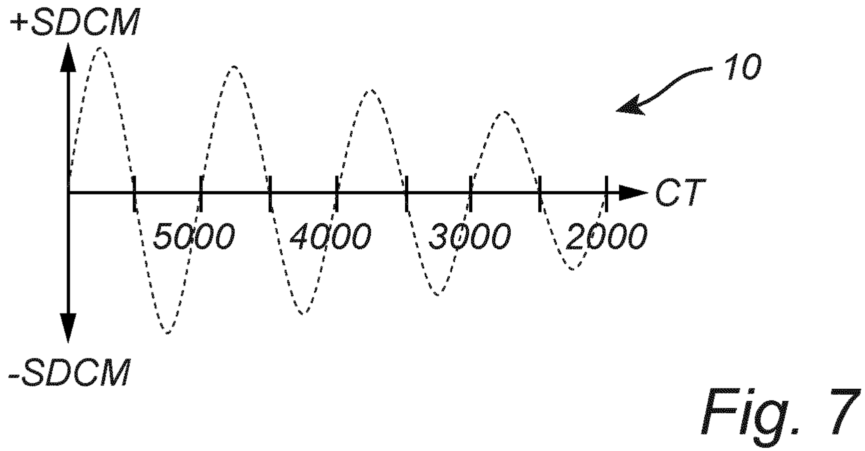
FIG. 7 shows a meandering curve adapted around the BBL, where the amplitude of the meandering curve decreases with decreasing color temperature.
Figure 8:
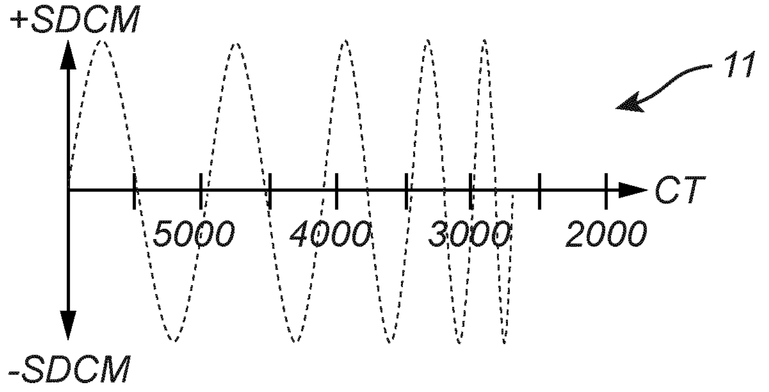
FIG. 8 shows a meandering curve adapted around the BBL, where the period of the meandering curve decreases with decreasing color temperature.

Referring to FIGS. 7 and 8, two other meandering curves adapted to the BBL are shown. The meandering curve 10 seen on FIG. 7 is adapted to have a gradually decreasing amplitude with decreasing color temperatures. The amplitude may alternatively be gradually increasing with decreasing color temperature. The amplitude change may also be done in steps instead of having it gradually. The decrease of the amplitude may be configured to be at least 10% over one period of the meandering curve 10, when going from warmer colors to colder colors or vice versa. The meandering curve 11 seen on FIG. 8 is adapted to gradually decrease the period of the meandering curve 11 when the color temperature decreases. The period may alternatively be gradually increasing with decreasing color temperature. The period change may also be done in steps instead of gradually. The decrease of the period may be configured to be at least 10% over one period of the meandering curve 11 when going from warmer colors to colder colors.

Figure 9:
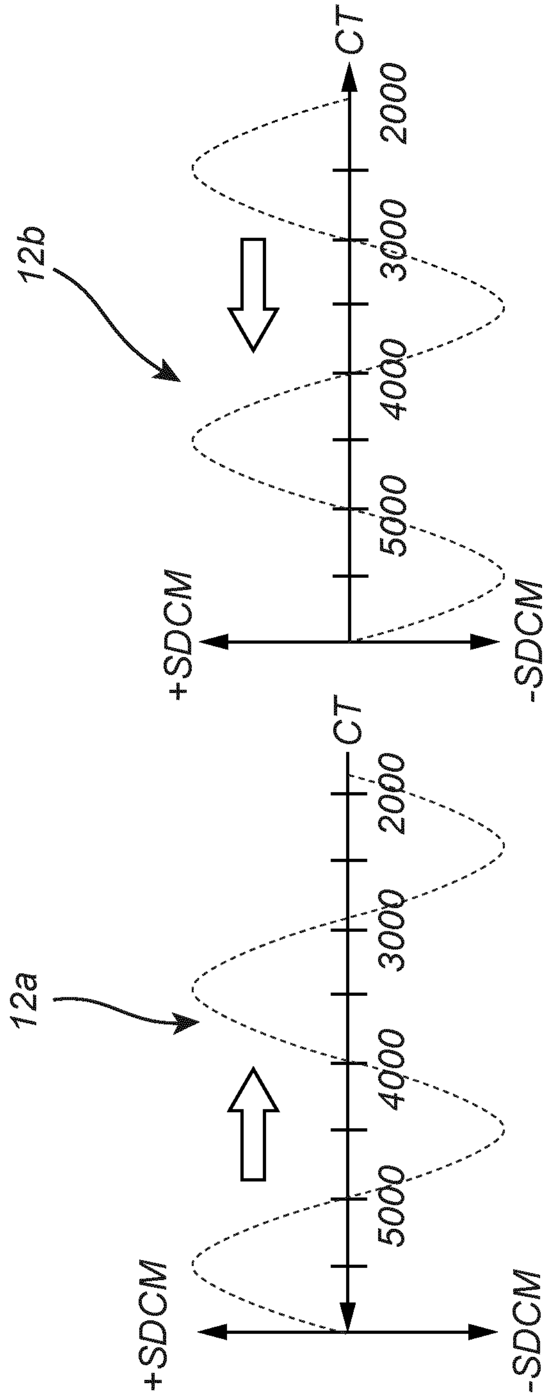
FIG. 9 shows a meandering curve adapted around the BBL, where the meandering curve experiences a phase-shift.

FIG. 9 shows another adaptation of a meandering curve 12*a*, 12*b* along the BBL according to the disclosure. The processing unit 3 may be adapted to phase shift the adapted curve, as shown in FIG. 9. The processing unit 3 may be provided with a threshold point in color space, where the processing unit 3 is adapted to phase shift the meandering curve when reaching the threshold point, or it may be done as a response to the time derivative of the color temperature changing sign. The processing unit 3 may be configured to phase shift the meandering curve by $\pi$, $0.5\pi$, $0.25\pi$, etc. By phase shifting the meandering curve it may allow for a wider variety of tints to be selected by a user. The threshold value for phase shifting the predetermined curve may also indicate that the processing unit 3 should start to decrease the color temperature instead of increasing when receiving the single input or vice versa, allowing for wider range of tints being available for a user. In the case where the control device already has a range indicated on it, e.g. as seen with a slider with its two ends, the processing unit 3 may be configured to phase change the meandering curve whenever an end value of the range is reached, e.g. when a slider is moved to either of the ends of the slider. The processing unit 3 may be configured to phase shift the meandering curve whenever it goes from decreasing to increasing the color temperature or vice versa, as is illustrated by the two meandering curves 12*a* and 12*b* on FIG. 9.

Figure 10A:
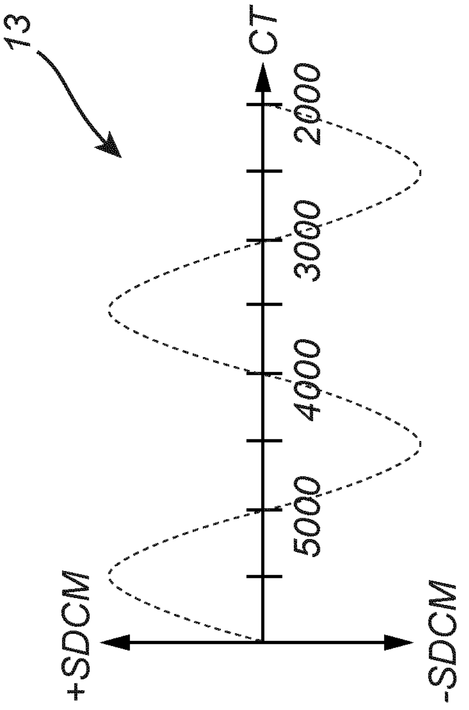
FIG. 10*a* shows a meandering curve adapted to the BBL in color space.
Figure 10B:
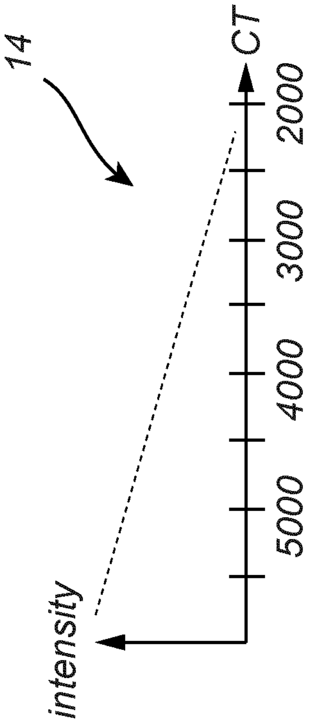
FIG. 10*b* shows an additional curve associated with the curve shown on FIG. 10*a*, the additional curve controlling the intensity of light as a function of color temperature.

FIGS. 10*a* and 10*b* shows a meandering curve adapted to the BBL with an associated luminous flux curve. The processing unit 3 may be provided with additional curves besides a meandering curve associated with it. FIG. 10*b* shows an example of such an additional curve 14. The additional curve 14 may control additional properties of the light emitted from the light emitting device 4, these additional properties may be associated with the color point of the light or may relate to other properties of the light emitted. The additional curve 14 seen FIG. 10*b* determines the luminous flux of the light emitting device 4 as a function of color temperature, with the luminous flux decreasing with decreasing color temperature. The additional curve 14 may also be set to increase the luminous flux of the light emitting device 4 when color temperature decreases.

Figure 12:
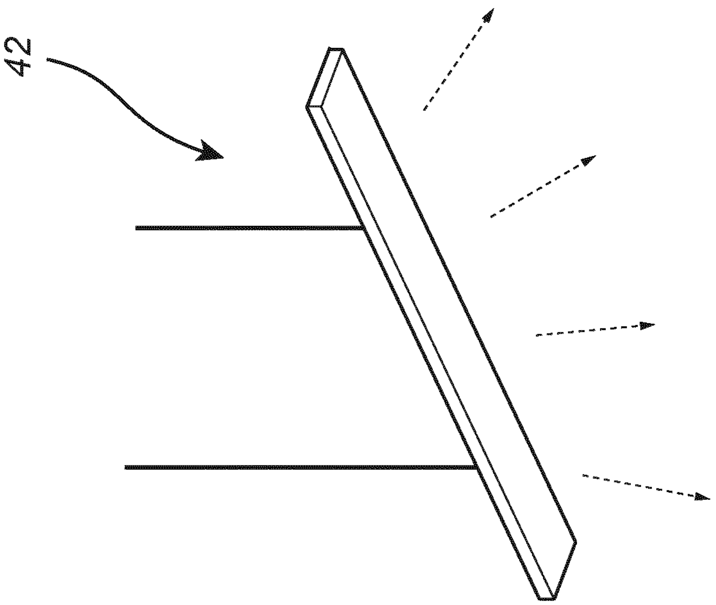
FIG. 12 shows a schematic view of a light emitting device in the form of a luminaire.
Figure 11:
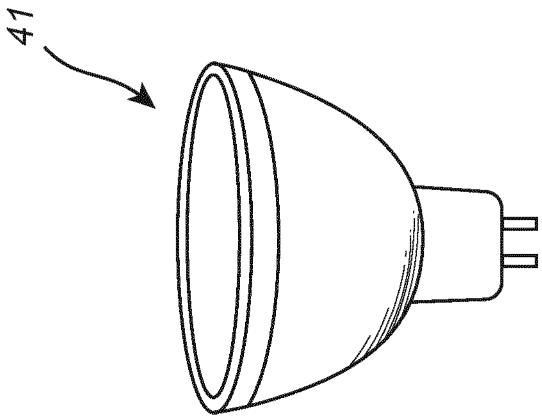
FIG. 11 shows a schematic view of a light emitting device in the form of a lamp.

Referring now to FIGS. 11 and 12, different light emitting devices 4, with which the controller 1 according to the disclosure may be communicatively connected or connectable to, are shown. A lamp 41 is shown on FIG. 11 and a luminaire 42 is shown on FIG. 12 as examples of light emitting devices 4 with a light exit surface emitting the emitted light, though the disclosure is not limited to this and may be carried out with a wide variety of different light fixtures.

Figure 13:
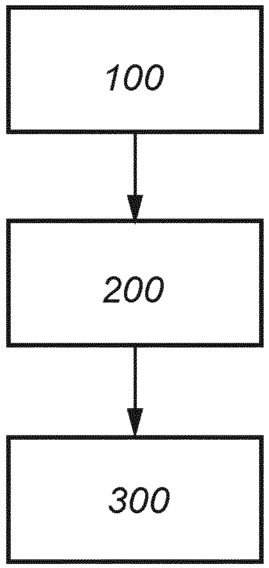
FIG. 13 shows a flowchart of a method according to the invention.

The disclosure as described also covers a method for controlling properties of light emitted from a light emitting device, FIG. 13 shows a flowchart exemplifying an embodiment of such a method. The method comprising three steps, a first step 100 of providing a controller according to the disclosure, a second step 200 of providing a single input to the user interface of the controller to control the properties of light emitted from the light emitting device, and a third step 300 of changing the color point of light emitted from the light emitting device based on the single input received at the user interface.

Specific embodiments of the invention have now been described. However, several alternatives are possible, as would be apparent for someone skilled in the art. For example, the processing unit 3 may be configured to adapt the color point of the light emitted from the light emitting device 4 by combining the different adaptations presented, e.g. a curve may be non-centralized and also experience a phase shift, therefore different combinations of the meandering curves presented must be considered to be within the scope of the present invention, as it is defined by the appended claims.

The invention claimed is:

1. A controller configured to control properties of light emitted from a light emitting device, the controller comprising:

a control device; and a processing unit;

the control device being configured to enable a user to select a color point of the light emitted from the light emitting device in a color space of the light emitting device, the color point being defined based on a tint and a color temperature, wherein the selection of the color point is done via a single input provided to the control device, the processing unit being configured to change the color point along a meandering curve allowing the user to adjust the color point of light emitted from the light emitting device based on the single input received via the control device, wherein the processing unit being configured to change the color point along said meandering curve extending along the black body locus (BBL) in accordance with the received single input, wherein a half period of the meandering curve is in the range from 300 to 1000 K, in the range from 350 to 700 K, or in the range from 400 to 600 K such as 500 K, and wherein the amplitude of the meandering curve is at least 10 standard deviation color matching (SDCM), at least 15 SDCM, or at least 20 SDCM.

2. A controller according to claim 1, wherein the meandering curve is centralized around the BBL.

3. A controller according to claim 1, wherein the meandering curve is non-centralized around the BBL.

4. A controller according to claim 1, wherein the meandering curve intersects the BBL in or at least five of the following color temperatures: 6000 K, 5500 K, 5000 K, 4500 K, 4000 K, 3500 K, 3000 K, 2700 K, 2500 K, 2300 K.

5. A controller according to claim 1, wherein an amplitude of the meandering curve decreases with decreasing color temperatures.

6. A controller according to claim 5, wherein the decrease in amplitude is gradual and at least 10% over one period.

7. A controller according to claim 1, wherein a period of the meandering curve decreases with decreasing color temperatures.

8. A controller according to claim 7, wherein the decrease in period is gradual and at least 10% over one period.

9. A controller according to claim 1, wherein the meandering curve is phase shifted when the color point goes beyond or to a preset threshold point for the color point and/or the time derivative of the color temperature changes sign.

10. A controller according to claim 1, wherein the processing unit is configured to decrease luminous flux of the light emitting device according to an additional curve, while decreasing the color temperature of the light emitting device.

11. A controller according to claim 1, wherein the control device is a button, a dial, a slider or a lever.

12. A lighting system for controlling properties of light emitted from a light emitting device, the lighting system comprising:

a controller according to claim 1; and a lamp, a luminaire or a lighting fixture, wherein the controller is communicatively connectable to or connected with the lamp, luminaire or lighting fixture.

13. A method of controlling properties of light emitted from a light emitting device, the method comprising the steps of:

providing a controller according to any of claim 1, and giving a single input to the user interface of the controller to control the properties of light emitted from the light emitting device, and by means of the processing unit of the controller, changing the color point of the light emitted by the light emitting device in a color space of the light emitted from the light emitting device based on the single input received at the user interface.

* * * * *